(12) United States Patent
Honda

(10) Patent No.: US 12,333,755 B2
(45) Date of Patent: Jun. 17, 2025

(54) INFORMATION PROCESSING SYSTEM, INFORMATION PROCESSING METHOD, AND STORAGE MEDIUM

(71) Applicant: TOYOTA JIDOSHA KABUSHIKI KAISHA, Toyota (JP)

(72) Inventor: Daisaku Honda, Kasugai (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 400 days.

(21) Appl. No.: 17/944,665

(22) Filed: Sep. 14, 2022

(65) Prior Publication Data

US 2023/0144073 A1    May 11, 2023

(30) Foreign Application Priority Data

Nov. 11, 2021 (JP) .................... 2021-184175

(51) Int. Cl.
*G06T 7/70* (2017.01)
*G06T 7/20* (2017.01)
*G06V 10/25* (2022.01)
*G06V 10/764* (2022.01)

(52) U.S. Cl.
CPC ................ *G06T 7/70* (2017.01); *G06T 7/20* (2013.01); *G06V 10/25* (2022.01); *G06V 10/764* (2022.01); *G06T 2207/30241* (2013.01); *G06T 2207/30252* (2013.01); *G06V 2201/07* (2022.01)

(58) Field of Classification Search
CPC .. G06T 7/70; G06T 7/20; G06T 7/215; G06T 7/10; G06T 2207/30232; G06T 2207/30236; G06T 2207/30241; G06T 2207/30248; G06T 2207/30252; G06T 2207/30256; G06V 10/25; G06V 10/255; G06V 10/26; G06V 10/22; G06V 10/764; G06V 2201/07; G06V 2201/08; G06V 20/52; G06V 20/588
See application file for complete search history.

(56) References Cited

U.S. PATENT DOCUMENTS

| | | | |
|---|---|---|---|
| 9,947,228 B1 | 4/2018 | Kim et al. | |
| 2009/0267801 A1* | 10/2009 | Kawai | G08G 1/096783 348/148 |
| 2012/0206483 A1* | 8/2012 | Funabashi | G08G 1/096783 345/629 |
| 2018/0068562 A1* | 3/2018 | Ho | G08G 1/04 |
| 2020/0047659 A1* | 2/2020 | Yagi | G08G 1/164 |
| 2020/0320313 A1* | 10/2020 | Huang | G08G 1/096775 |

FOREIGN PATENT DOCUMENTS

| | | |
|---|---|---|
| CN | 113075716 A | 7/2021 |
| JP | 2002-279582 A | 9/2002 |
| JP | 2019-071057 A | 5/2019 |
| JP | 2021-518623 A | 8/2021 |
| WO | 2019/180551 A1 | 9/2019 |

* cited by examiner

*Primary Examiner* — Oneal R Mistry
*Assistant Examiner* — Duy Tran
(74) *Attorney, Agent, or Firm* — Oliff PLC

(57) ABSTRACT

An information processing system includes a controlling portion configured to, based on an image captured by an image capturing apparatus provided on a roadside, calculate a rectangular area including a vehicle in the image, the controlling portion being configured to calculate the position of a front face of the vehicle based on the rectangular area thus calculated and a trajectory set in the image.

10 Claims, 12 Drawing Sheets

FIG. 6

| IMAGE CAPTURING APPARATUS ID | VEHICLE TYPE | VEHICLE SPEED | TRAJECTORY | INFORMATION INDICATIVE OF POSITION AT EACH ANGLE | HISTORY OF MOVEMENT OF RECTANGULAR AREA |
|---|---|---|---|---|---|
| IMAGE CAPTURING APPARATUS A | VEHICLE TYPE A | VEHICLE SPEED A | TRAJECTORY A1 | FUNCTION A1 | HISTORY A1 |
| | | VEHICLE SPEED B | TRAJECTORY A2 | FUNCTION A2 | HISTORY A2 |
| | | ... | ... | ... | ... |
| | VEHICLE TYPE B | VEHICLE SPEED A | TRAJECTORY B1 | FUNCTION B1 | HISTORY B1 |
| | | VEHICLE SPEED B | TRAJECTORY B2 | FUNCTION B2 | HISTORY B2 |
| | | ... | ... | ... | ... |
| | VEHICLE TYPE C | ... | ... | ... | ... |
| | ... | ... | ... | ... | ... |
| IMAGE CAPTURING APPARATUS B | ... | ... | ... | ... | ... |
| ... | ... | ... | ... | ... | ... |

601

INFORMATION PROCESSING SYSTEM, INFORMATION PROCESSING METHOD, AND STORAGE MEDIUM

CROSS-REFERENCE TO RELATED APPLICATION

This application claims priority to Japanese Patent Application No. 2021-184175 filed on Nov. 11, 2021, incorporated herein by reference in its entirety.

BACKGROUND

1. Technical Field

This disclosure relates to an information processing system, an information processing method, and a storage medium.

2. Description of Related Art

In recent years, an intelligent transport system (ITS) that utilizes images of a road surface and the like that are captured by an image capturing apparatus (a roadside camera) provided on a roadside has attracted attention.

Further, there has been known a technology in which, based on an image, a rectangular area (a bounding box) including a vehicle in the image is calculated (e.g., see Japanese Unexamined Patent Application Publication No. 2019-071057 (JP 2019-071057 A)).

SUMMARY

However, in the related art, it might be difficult to detect the position of the front face of a vehicle from an image captured by the image capturing apparatus provided on the roadside, for example.

An object of this disclosure is to provide an information processing system, an information processing method, and a storage medium each of which can appropriately detect the position of the front face of a vehicle based on an image captured by an image capturing apparatus provided on a roadside.

In a first aspect according to this disclosure, an information processing system includes a controlling portion. The controlling portion is configured to, based on an image captured by an image capturing apparatus provided on a roadside, calculate a rectangular area including a vehicle in the image, and the controlling portion is configured to calculate the position of a front face of the vehicle based on the rectangular area thus calculated and a trajectory set in the image.

Further, a second aspect according to this disclosure provides an information processing method including: calculating, based on an image captured by an image capturing apparatus provided on a roadside, a rectangular area including a vehicle in the image; and calculating the position of a front face of the vehicle based on the rectangular area thus calculated and a trajectory set in the image.

Further, a third aspect according to this disclosure provides storage medium that stores a program causing a computer to execute a process of: calculating, based on an image captured by an image capturing apparatus provided on a roadside, a rectangular area including a vehicle in the image; and calculating the position of a front face of the vehicle based on the rectangular area thus calculated and a trajectory set in the image.

With any one of the aspect according to this disclosure, the position of the front face of a vehicle can be detected appropriately.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 6 is a view illustrating an example of a trajectory DB according to the embodiment;

DETAILED DESCRIPTION OF EMBODIMENTS

Figure 1:
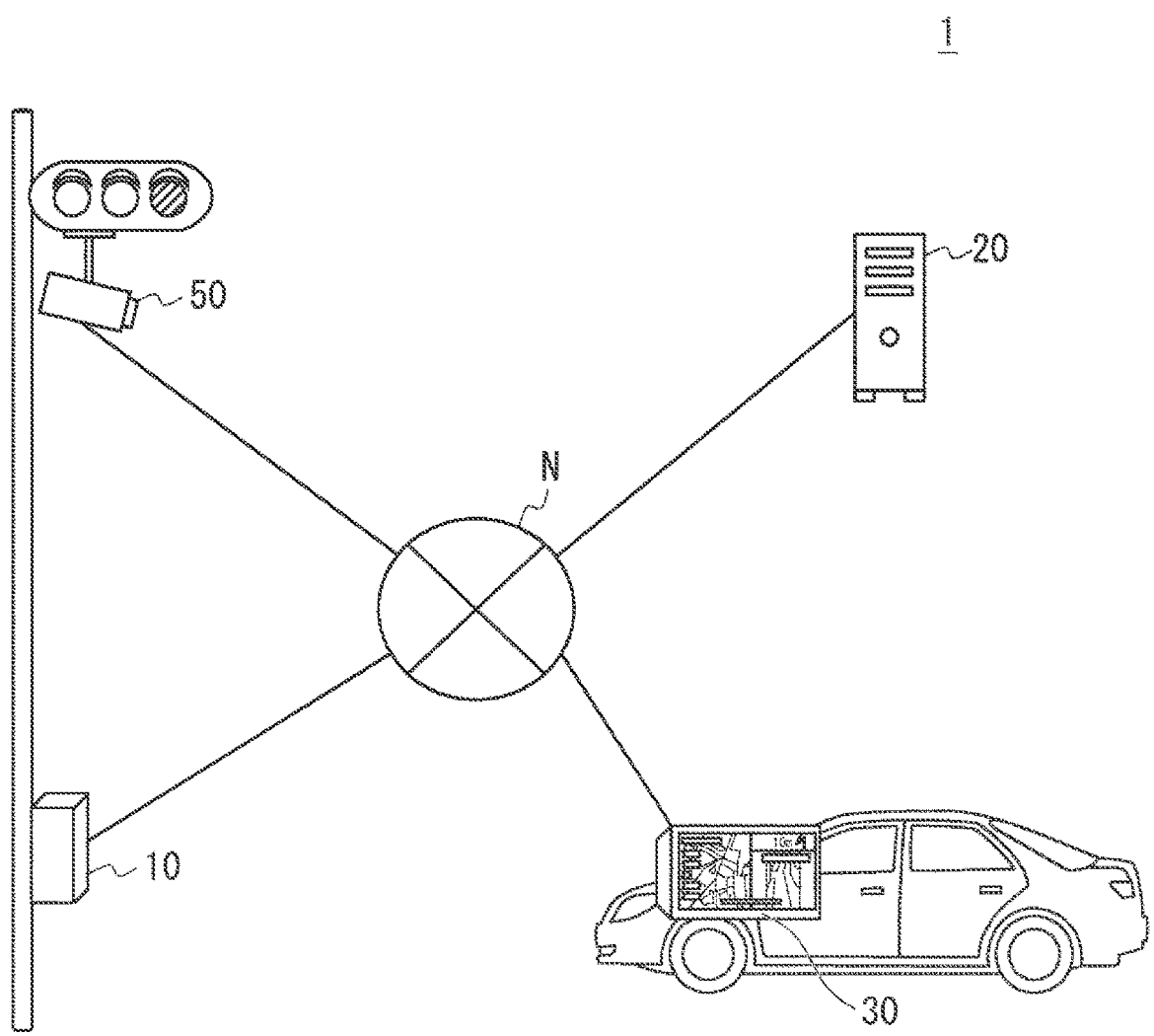
FIG. 1 is a view illustrating an exemplary configuration of a road transportation system according to an embodiment.

The principle of this disclosure will be described with reference to some exemplary embodiments. It should be understood that these embodiments are described only to provide examples and help a person skilled in the art to understand and carry out this disclosure without suggesting restrictions on the scope of this disclosure. The disclosure described herein can be also implemented by various methods other than what is described below.

In the following description and claims, all terminologies and scientific terms as used herein have the same meanings as those generally understood by a person skilled in the art in the technical field to which this disclosure belongs, unless otherwise defined.

With reference to drawings, the following describes embodiments of the present disclosure.

System Configuration

A configuration of a road transportation system 1 in the embodiment will be described with reference to FIG. 1. FIG.

1 is a view illustrating an exemplary configuration of the road transportation system 1 according to the embodiment. In the example of FIG. 1, the road transportation system 1 includes an image capturing apparatus 50, an information processing apparatus 10, a server 20, and a vehicle terminal 30. Note that the number of image capturing apparatuses 50, the number of information processing apparatuses 10, the number of servers 20, and the number of vehicle terminals 30 are not limited to those in the example of FIG. 1. Note that the information processing apparatus 10 is one example of an "information processing system."

In the example of FIG. 1, the image capturing apparatus 50, the information processing apparatus 10, the server 20, and the vehicle terminal 30 are connected to each other via a network N in a communicable manner. Examples of the network N include, for example, a bus, short-distance wireless communication such as Bluetooth (registered trademark) Low Energy (BLE), a local area network (LAN), a wireless LAN, the Internet, a mobile communication system, and so on. Examples of the mobile communication system include, for example, a fifth-generation mobile communication system (5G), a fourth-generation mobile communication system (4G), a third-generation mobile communication system (3G), and so on.

The image capturing apparatus 50 is a camera provided on a roadside or the like (e.g., an intersection or the like) of a road where a vehicle travels. The image capturing apparatus 50 captures an image of a vehicle traveling on the road and transmits (outputs) data of the image to the information processing apparatus 10.

The information processing apparatus 10 may be provided in a lower part of a pole where the image capturing apparatus 50 is provided, for example. In this case, the information processing apparatus 10 may be accommodated in a housing in which a traffic signal control machine configured to control a traffic light is accommodated, for example. Alternatively, the information processing apparatus 10 may be accommodated in a housing in which a base station or the like for a mobile communication system is accommodated, the base station being provided in the traffic light, for example.

The information processing apparatus 10 determines the position of the front face of the vehicle (its distal end in the advancing direction of the vehicle) based on an image captured by the image capturing apparatus 50. The information processing apparatus 10 transmits (outputs) information based on the determined position to the server 20. The information processing apparatus 10 may calculate a probability of a collision between a first vehicle and a second vehicle based on the transition of the position of the first vehicle and the transition of the position of the second vehicle at the intersection, for example. When the probability is equal to or more than a threshold, the information processing apparatus 10 transmits a notification about the probability to the server 20 or respective vehicle terminals 30 of the vehicles. Further, when the probability is equal to or more than the threshold, the information processing apparatus 10 transmits a notification about information on the transition of the position of one of the vehicles to the vehicle terminal 30 of the other one of the vehicles directly or via the server 20. The server 20 transmits a notification of a warning or the like to the vehicle terminals 30 based on information received from the information processing apparatus 10.

The vehicle terminal 30 may be also a car navigation device, an in-vehicle electronic control unit (ECU), or a terminal such as a smartphone or a tablet, for example. When the vehicle terminal 30 receives a warning from the information processing apparatus 10 or the server 20, the vehicle terminal 30 provides (displays or outputs by voice) a notification to promote a driver of the vehicle to brake, for example. Further, the vehicle terminal 30 displays, on a screen, the information indicative of the transition of the position of the vehicle, the information being received from the information processing apparatus 10 or the server 20.

Hardware Configuration

Figure 2:
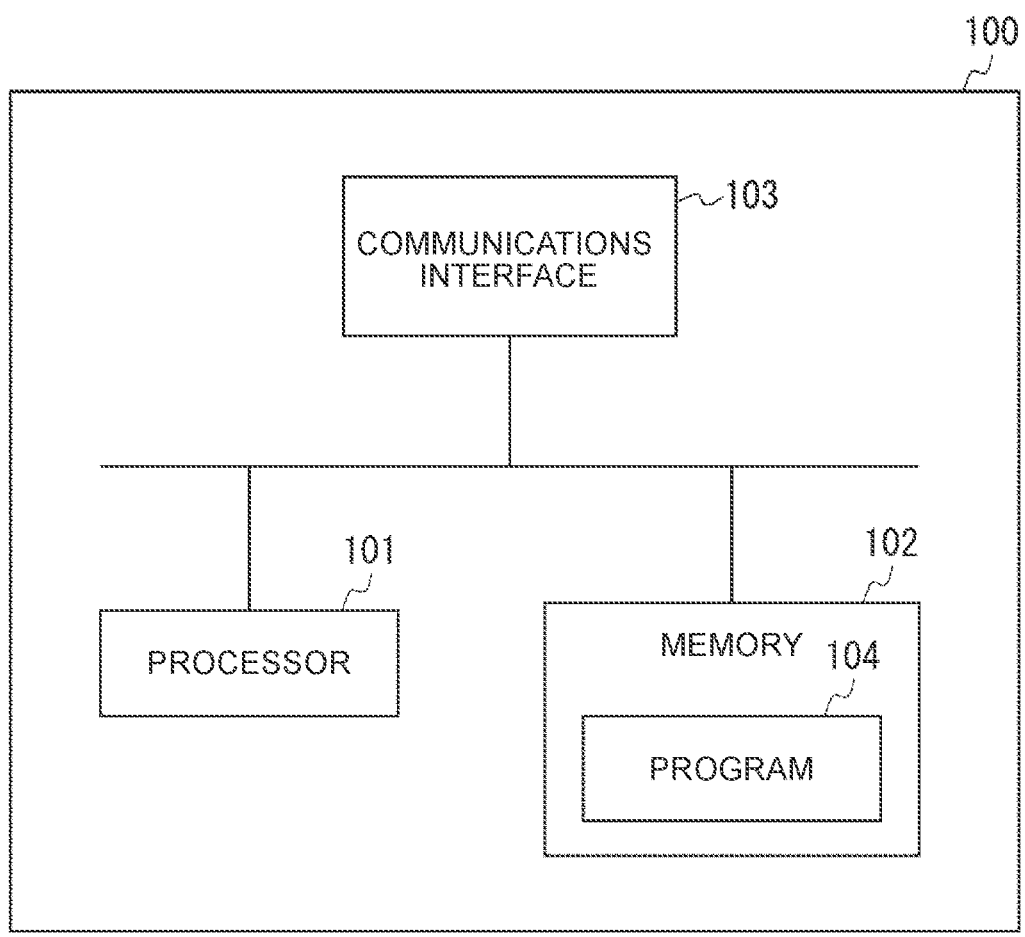
FIG. 2 is a view illustrating an exemplary hardware configuration of an information processing apparatus according to the embodiment.

FIG. 2 is a view illustrating an exemplary hardware configuration of the information processing apparatus 10 according to the embodiment. In the example of FIG. 2, the information processing apparatus 10 (a computer 100) includes a processor 101, a memory 102, and a communications interface 103. These portions are connected to each other via a bus or the like. In the memory 102, at least some programs 104 are stored. The communications interface 103 includes an interface necessary for communication with other network elements.

When the program 104 is executed by collaboration of the processor 101, the memory 102, and so on, at least part of the process of the embodiment of this disclosure is performed by the computer 100. The memory 102 may be a given type of memory suitable for a local technical network. The memory 102 may be also a non-temporary computer-readable storage medium as a nonlimiting example. Further, the memory 102 may be implemented by use of any appropriate data storage technology such as a semiconductor-based memory device, a magnetic memory device and system, an optical memory device and system, a fixed memory, and removable memory. Only one memory 102 is illustrated in the computer 100, but some physically different memory modules may be present in the computer 100. The processor 101 may be any type of processor. The processor 101 may include one or more of a general purpose computer, an exclusive computer, a microprocessor, a digital signal processor (DSP), and a processor based on a multi-core processor architecture as a nonlimiting example. The computer 100 may include a plurality of processors such as an application specific integrated circuit chip temporally subordinate to a clock synchronizing a main processor.

In the embodiment of this disclosure, the computer 100 can be implemented by hardware, a dedicated circuit, software, logic, or any combination thereof. In some forms, the computer 100 may be implemented by hardware. In the meantime, in other forms, the computer 100 may be implemented by firmware or software that can be executed by a controller, a microprocessor, or other computing devices.

Further, this disclosure also provides at least one computer program product tangibly stored in a non-temporary computer-readable storage medium. The computer program product includes a computer executable command such as a command included in a program module. The computer program product is executed by a device on a target actual processor or virtual processor so as to execute the process or the method in this disclosure. The program module includes a routine, a program, a library, an object, a class, a component, a data structure, or the like that executes a specific task or implements a specific abstract data type. The functions of program modules may be combined or divided such that the functions of the program modules are implemented desirably in various embodiments. Machine executable commands in the program modules can be executed locally or in distributed devices. In the distributed devices, the program modules can be placed in both of local and remote storage media.

Program codes to execute the method of this disclosure may be written by any combination of one or more programming languages. The program codes are provided to a processor or a controller of a general purpose computer, an exclusive computer, or other programmable data processing apparatuses. When the program codes are executed by the processor or the controller, functions or operations in a flowchart and/or a block diagram to be implemented are executed. The program codes are completely executed on a machine, partially executed on a machine as a stand-alone software package, partially executed on a machine and partially executed on a remote machine, or completely executed on a remote machine or a server.

Programs can be stored in various types of non-transitory computer readable media and supplied to a computer. The non-transitory computer readable media include various types of tangible storage media. Examples of the non-transitory computer readable medium include a magnetic recording medium, a magneto-optical recording medium, an optical disk medium, a semiconductor memory, and so on. Examples of the magnetic storage medium include a flexible disk, a magnetic tape, a hard disk drive, and so on, for example. Examples of the magneto-optical recording medium include a magneto-optical disk, and so on, for example. Examples of the optical disk medium include a Blu-ray disc, a Compact Disc Read Only Memory (CD-ROM), a Compact Disk Recordable (CD-R), a Compact Disc ReWritable (CD-RW), and so on, for example. Examples of the semiconductor memory include a solid state drive, a mask ROM, a programmable ROM (PROM), an erasable PROM (EPROM), a flash ROM, a random access memory (RAM), and so on, for example. Further, the program can be supplied to a computer by various types of transitory computer readable media. Examples of the transitory computer readable media include an electrical signal, an optical signal, and an electromagnetic wave. The transitory computer readable media can supply the programs to the computer via a wired communication channel such as an electric wire or an optical fiber, or a wireless communication channel.

Configuration

Figure 3:
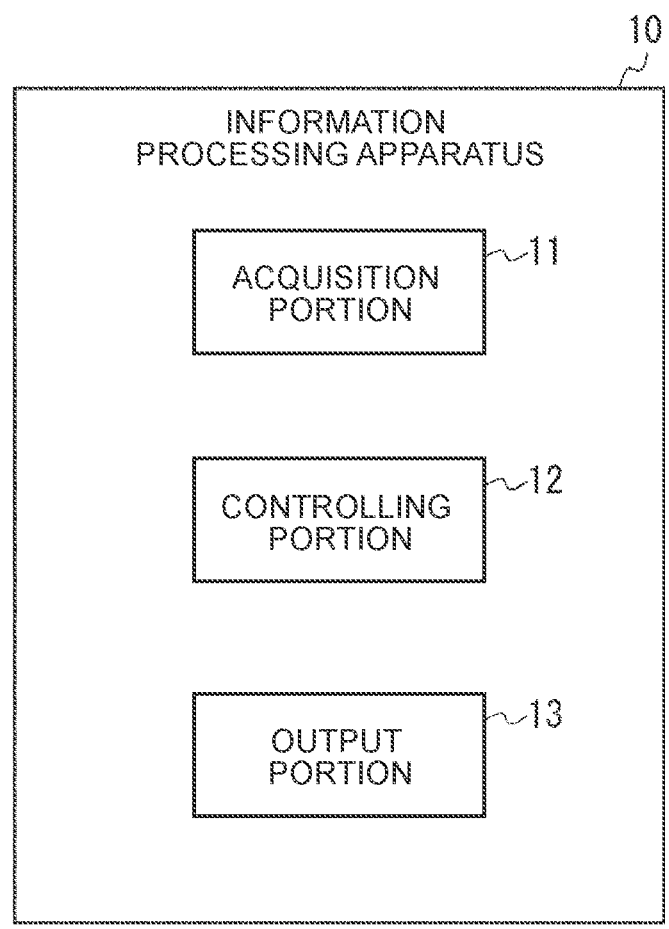
FIG. 3 is a view illustrating an example of a configuration of the information processing apparatus according to the embodiment.

A configuration of the information processing apparatus 10 in the embodiment will be described with reference to FIG. 3. FIG. 3 is a view illustrating an example of a configuration of the information processing apparatus 10 according to the embodiment. In the example of FIG. 3, the information processing apparatus 10 includes an acquisition portion 11, a controlling portion 12, and an output portion 13. These portions may be implemented by collaboration of one or more programs installed in the information processing apparatus 10 with hardware such as the processor 101, the memory 102, and so on of the information processing apparatus 10.

The acquisition portion 11 acquires various pieces of information from a storage portion in the information processing apparatus 10 or an external device. The acquisition portion 11 acquires an image captured by the image capturing apparatus 50 provided on the roadside, for example.

The controlling portion 12 calculates, based on the image acquired by the acquisition portion 11, a rectangular area (a bounding box) having a rectangular shape (an oblong shape or a square shape in which four corners are equal to each other; in this disclosure, it is assumed that the square shape is also included in the rectangular shape), the rectangular area including a vehicle in the image. Then, the controlling portion 12 calculates the position of the front face of the vehicle based on the rectangular area in the image and a trajectory in the image that is set in advance.

The output portion 13 outputs a warning or the like based on the position of the front face of the vehicle, the position being calculated by the controlling portion 12.

Process

Figure 4:
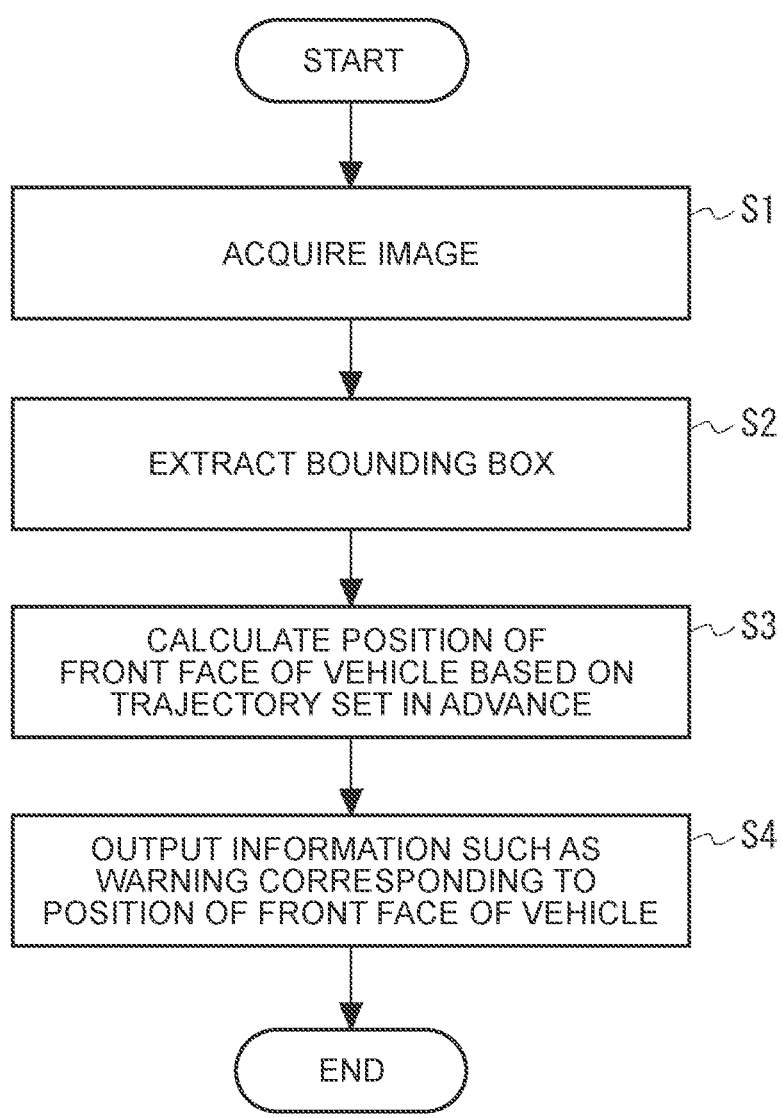
FIG. 4 is a flowchart illustrating an example of a process of the information processing apparatus according to the embodiment.
Figure 5:
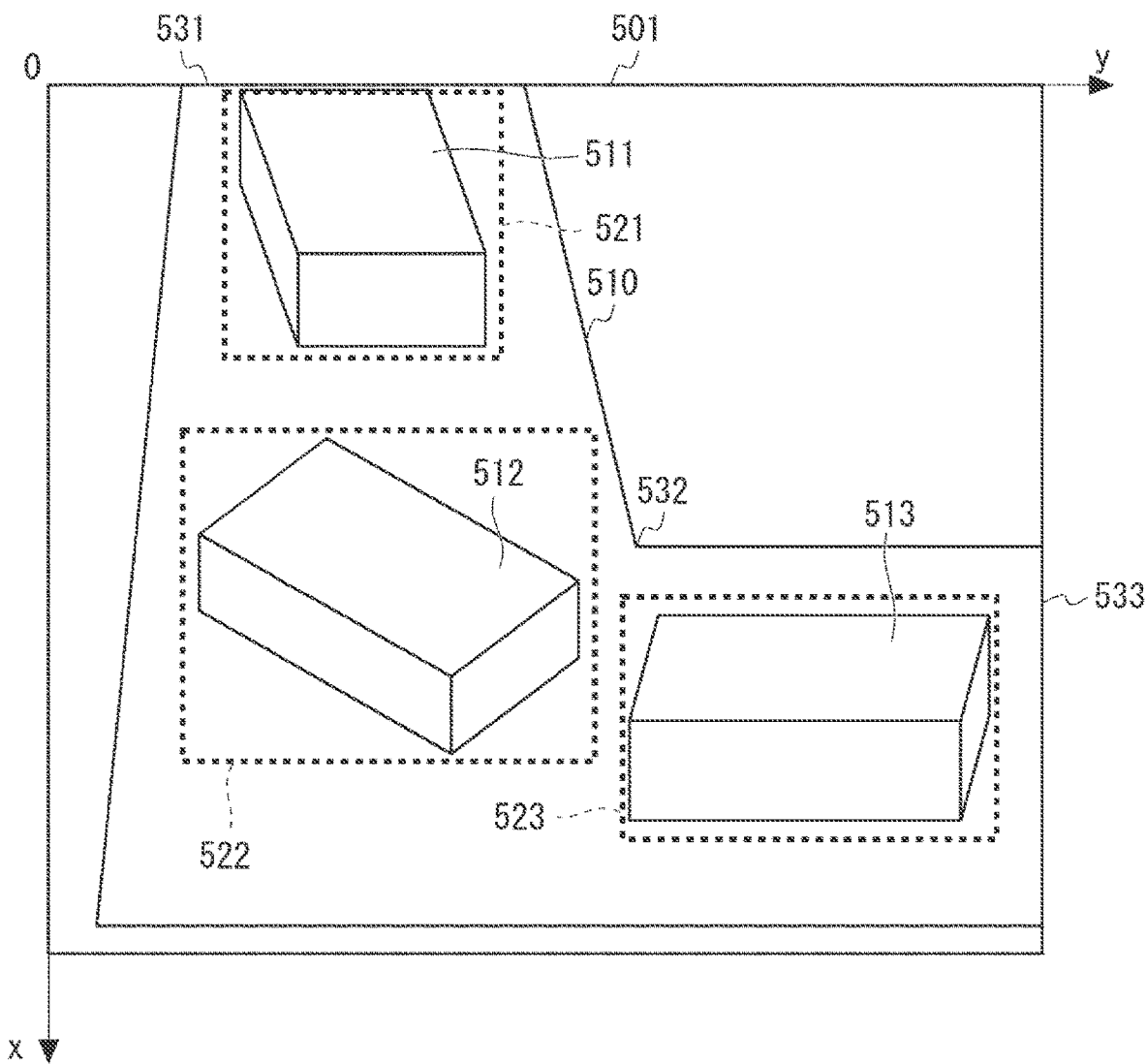
FIG. 5 is a view illustrating examples of rectangular areas each including a vehicle in an image captured by an image capturing apparatus according to the embodiment.
Figure 7:
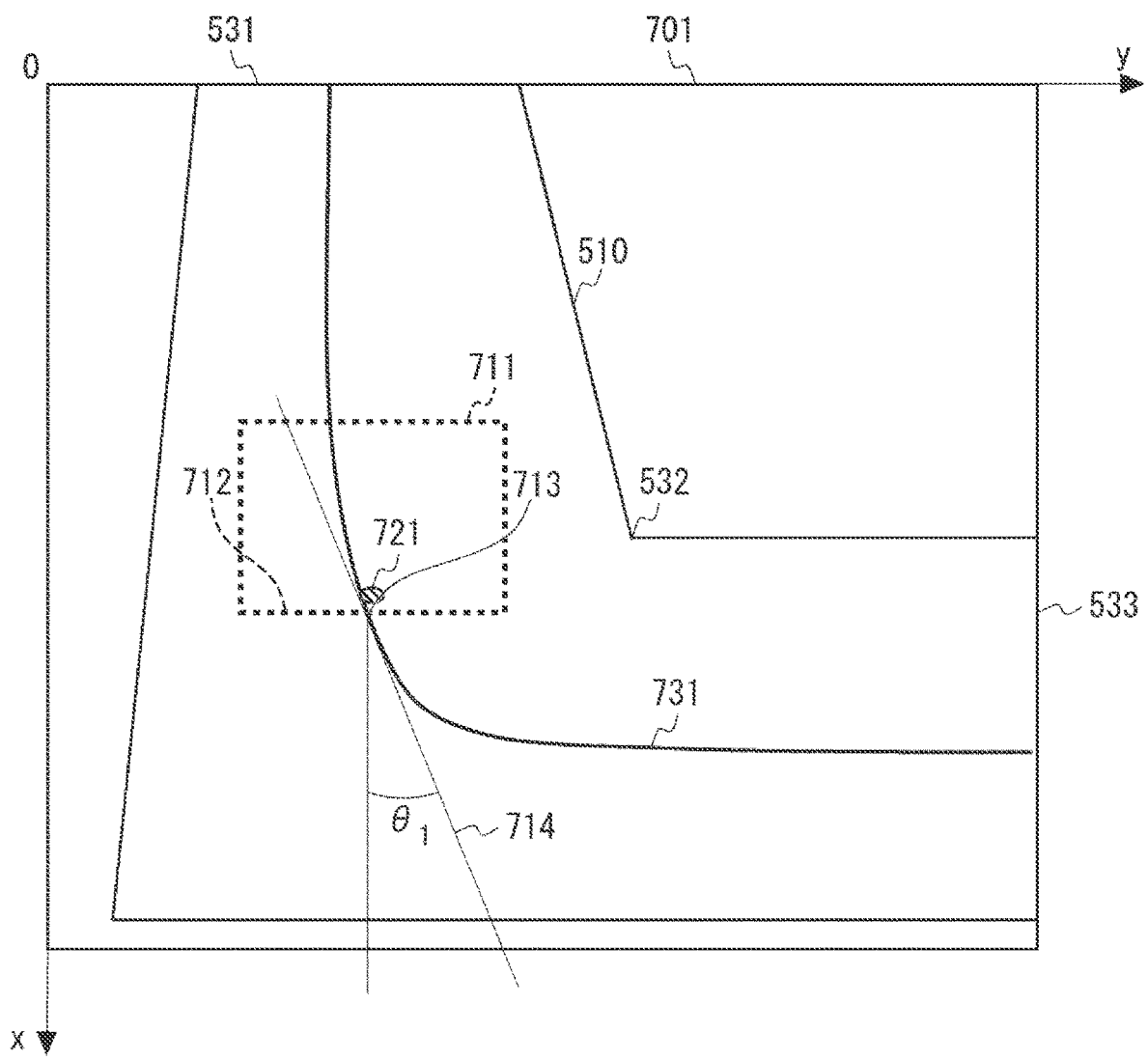
FIG. 7 is a view illustrating an example of a process of calculating the position of a central part of the front face of a vehicle in a rectangular area according to the embodiment.
Figure 8:
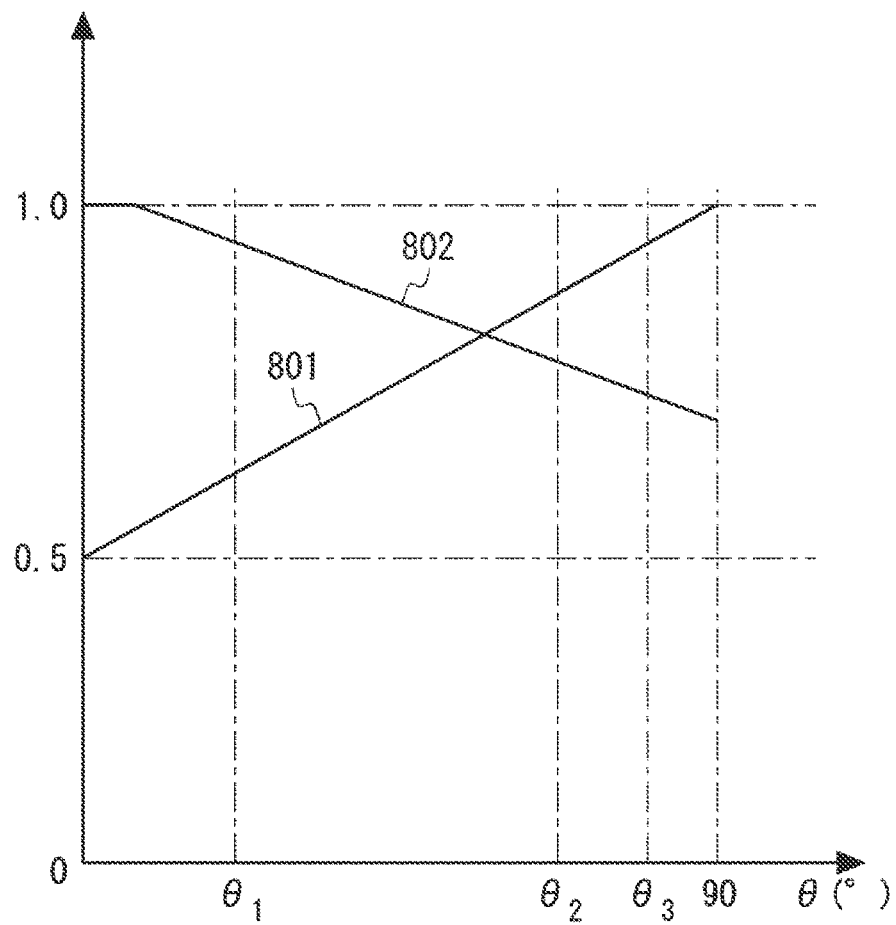
FIG. 8 is a view illustrating an example of information indicative of a position at each angle according to the embodiment.
Figure 9:
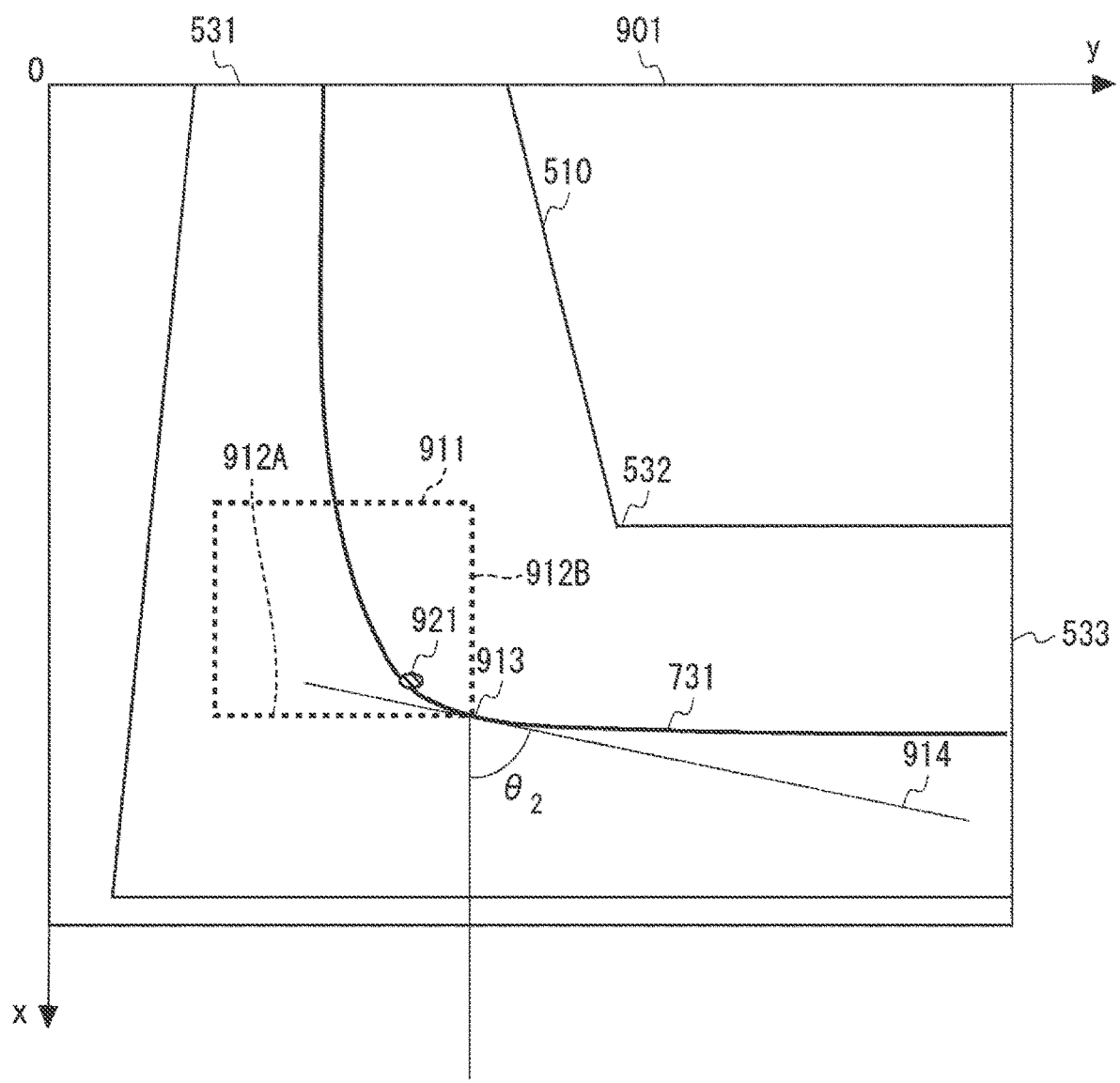
FIG. 9 is a view illustrating an example of the process of calculating the position of the central part of the front face of the vehicle in the rectangular area according to the embodiment.
Figure 10:
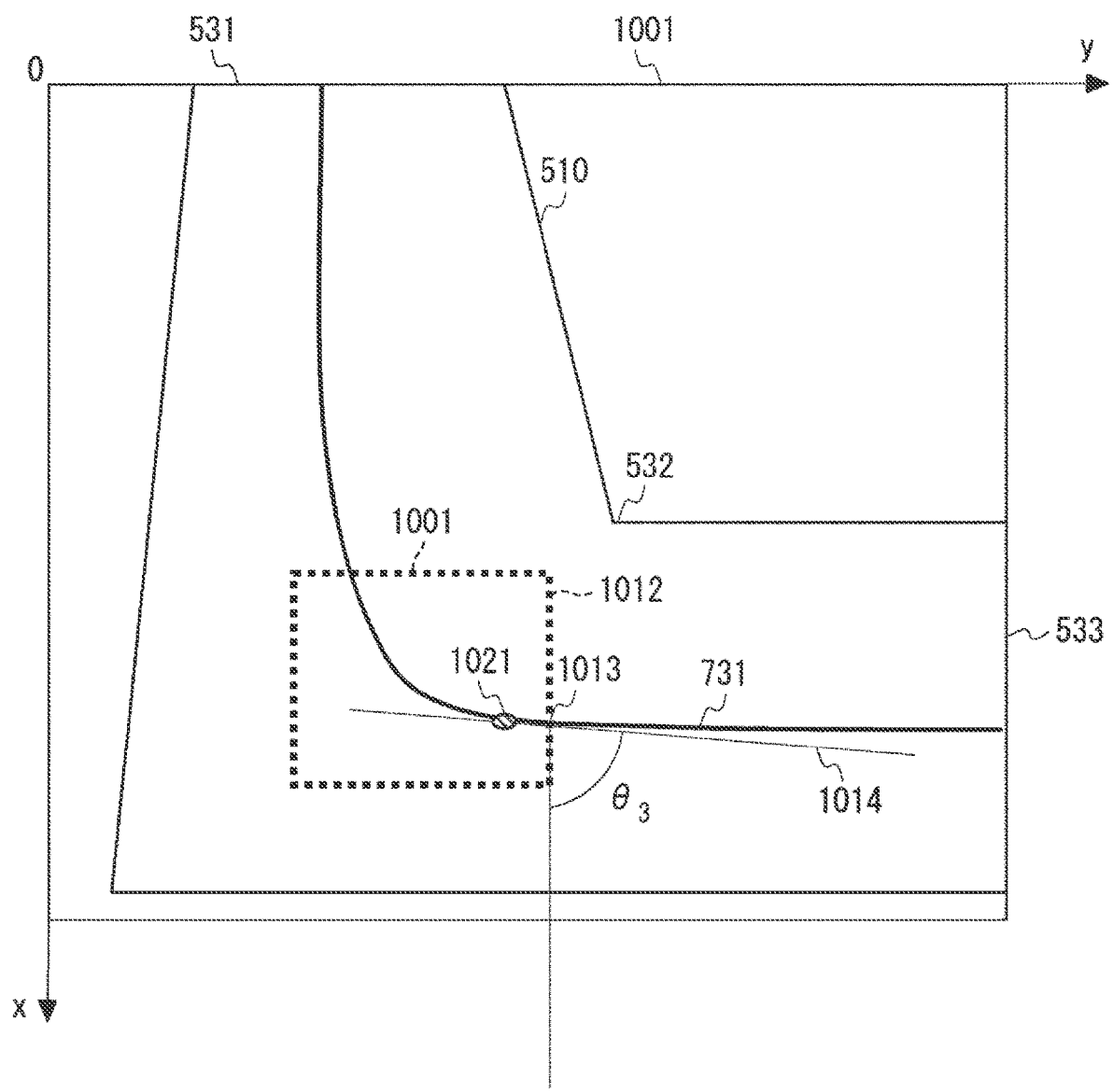
FIG. 10 is a view illustrating an example of the process of calculating the position of the central part of the front face of the vehicle in the rectangular area according to the embodiment.
Figure 11:
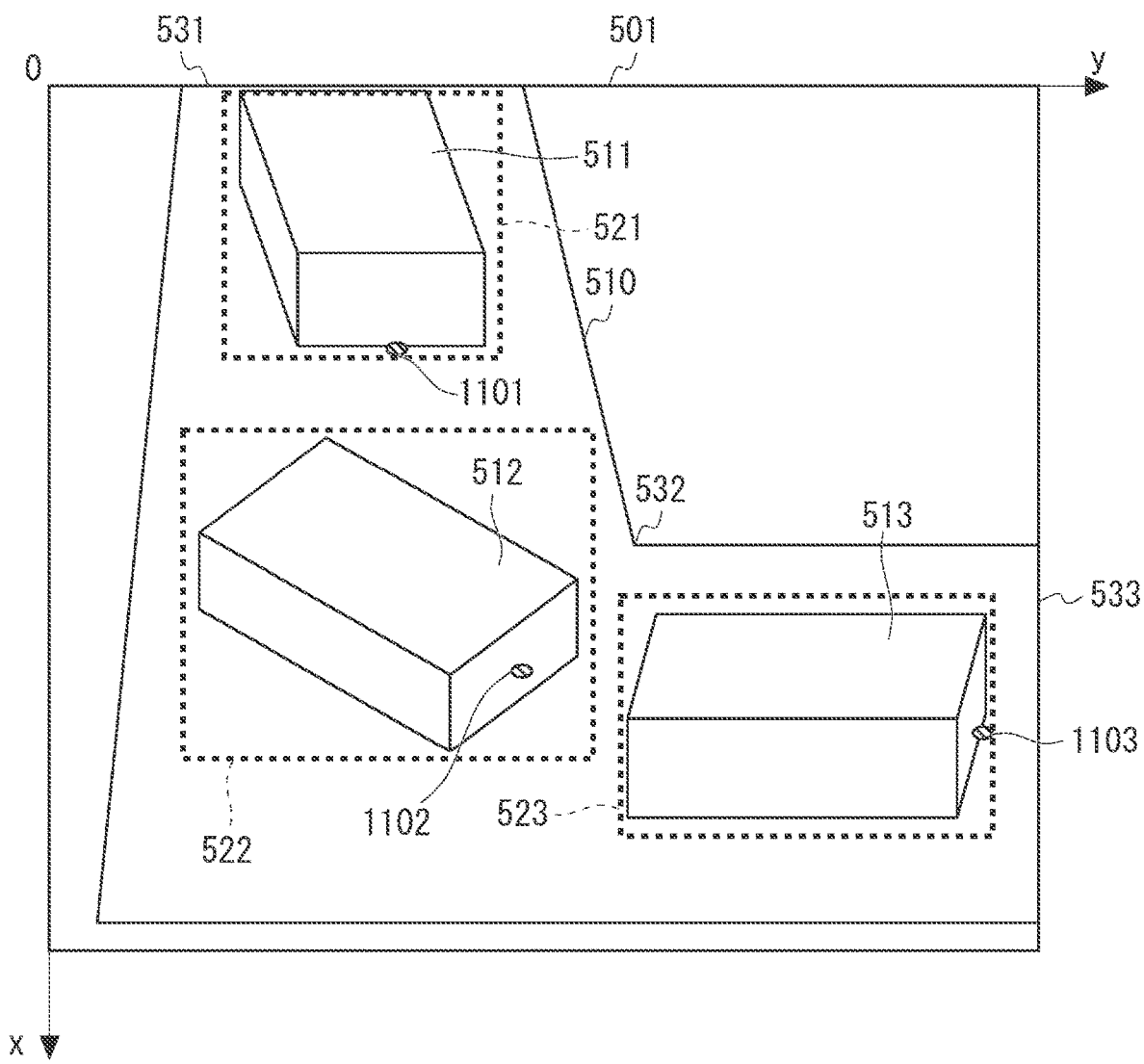
FIG. 11 is a view illustrating an example of the positions of respective central parts of the front faces of vehicles in the image captured by the image capturing apparatus according to the embodiment.
Figure 12:
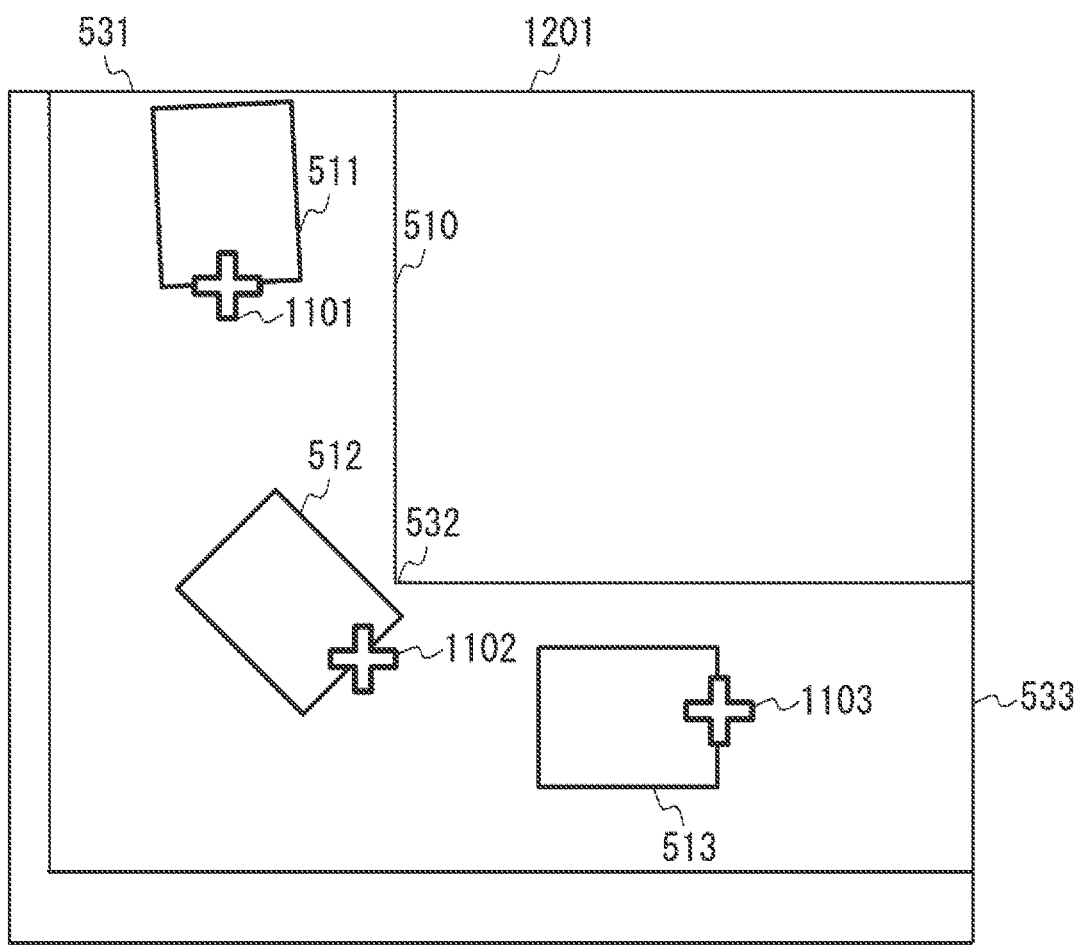
FIG. 12 is a view illustrating an example of a display screen of a vehicle terminal according to the embodiment.

Next will be described an example of a process of the information processing apparatus 10 in the embodiment with reference to FIGS. 4 to 12. FIG. 4 is a flowchart illustrating an example of the process of the information processing apparatus 10 according to the embodiment. FIG. 5 is a view illustrating examples of rectangular areas each including a vehicle in an image captured by the image capturing apparatus 50 according to the embodiment. FIG. 6 is a view illustrating an example of a trajectory DB 601 according to the embodiment. FIG. 7 is a view illustrating an example of a process of calculating the position of a central part of the front face of the vehicle in the rectangular area according to the embodiment. FIG. 8 is a view illustrating an example of information indicative of a position at each angle according to the embodiment. FIG. 9 is a view illustrating an example of the process of calculating the position of the central part of the front face of the vehicle in the rectangular area according to the embodiment. FIG. 10 is a view illustrating an example of the process of calculating the position of the central part of the front face of the vehicle in the rectangular area according to the embodiment. FIG. 11 is a view illustrating an example of the position of the central part of the front face of the vehicle in the image captured by the image capturing apparatus 50 according to the embodiment. FIG. 12 is a view illustrating an example of a display screen of the vehicle terminal 30 according to the embodiment.

In step S1, the acquisition portion 11 of the information processing apparatus 10 acquires an image captured by the image capturing apparatus 50 provided on the roadside of the road where vehicles travel.

Subsequently, based on the image thus acquired, the controlling portion 12 of the information processing apparatus 10 extracts a rectangular area including a vehicle in the image (step S2). Here, the information processing apparatus 10 recognizes, for example, an object in the image and calculates a smallest rectangular area surrounding the object. The information processing apparatus 10 may calculate the central coordinates, the height, and the width of the rectangular area.

The following description deals with an example in which a rectangular area, the position of the front face of a vehicle, and so on are calculated in a pixel coordinate system in which pixel numbers are taken as values of x and y coordinates with a downward direction along the vertical direction (the height) of the image being taken as an x-axis direction and a rightward direction along the lateral direction (the width) of the image being taken as a y-axis direction.

In the example of FIG. 5, in an image 501 of a road 510 that is captured by the image capturing apparatus 50 provided on a roadside of an intersection, a rectangular area 521 including a vehicle 511, a rectangular area 522 including a vehicle 512, and a rectangular area 523 including a vehicle 513 are detected. In the example of FIG. 5, each side of each of the rectangular areas 521, 522, 523 is parallel to the x-axis or the y-axis. Note that, in the road 510, the following is determined by laws and regulations or the like. That is, a vehicle enters an image-capturing range (an angle of view) of the image capturing apparatus 50 from an end portion 531 side in the image 501, turns left at a corner 532 of the road 510, and goes out of the image-capturing range from the end portion 533 in the image 501. Note that, in the example of FIG. 5, each vehicle is illustrated as a schematic figure for description.

Subsequently, the controlling portion 12 of the information processing apparatus 10 calculates the position of the front face of the vehicle based on the rectangular area in the image and a trajectory set in advance in the trajectory DB 601 (step S3).

In the example of FIG. 6, in the trajectory DB 601, a trajectory, information on a position at each angle, and a history of movement of a rectangular area are stored in association with the combination of an image capturing apparatus ID, a vehicle type, and a vehicle speed. Note that the trajectory DB 601 may be stored in the information processing apparatus 10 or may be stored in an external device. The image capturing apparatus ID is identification information on the image capturing apparatus 50. Note that, in a case where the information processing apparatus 10 processes images only from one image capturing apparatus 50, the field of the image capturing apparatus ID may be omitted. The vehicle type is the category of a vehicle. The vehicle type may include, for example, a heavy vehicle, a regular vehicle, a compact vehicle, a motorcycle, a large motorcycle, and so on. The vehicle speed is the speed of a vehicle. The vehicle speed may have a predetermined number of (e.g., five) levels, for example. In this case, the vehicle speed is categorized into levels such as a very low speed (e.g., 0 km/h to 20 km/h), a low speed (e.g., 20 km/h to 40 km/h), a medium speed (e.g., 40 km/h to 60 km/h), a high speed (e.g., 60 km/h to 80 km/h), and a very high speed (80 km/h or more), for example.

The trajectory is a trajectory on the pixel coordinates of an image captured by the image capturing apparatus 50 and indicates a trajectory along which a predetermined part of a vehicle (e.g., a central part of the front face of the vehicle or a central part of the vehicle) of each vehicle type moves when the vehicle travels (moves) on a road at each vehicle speed. The trajectory may be also the central position of a lane in the image captured by the image capturing apparatus 50. Information on the trajectory may be set in the trajectory DB 601 in advance by an administrator or the like of the information processing apparatus 10, for example. Further, the information on the trajectory may be set in the trajectory DB 601 such that the trajectory is calculated (estimated or derived) based on the image captured by the image capturing apparatus 50 by Artificial Intelligence (AI) or the like using deep learning or the like, for example.

The information indicative of a position at each angle is information to calculate the position of the front face of the vehicle based on an angle formed between a tangent of a trajectory at an intersection and a predetermined side of a rectangular image captured by the image capturing apparatus 50, the intersection being between the trajectory and a predetermined side of a rectangular area including a vehicle. The information indicative of a position at each angle may be a function or may be a data of a table including a plurality of combinations of an angle and a position, for example. The information indicative of a position at each angle may be set in the trajectory DB 601 in advance by the administrator or the like of the information processing apparatus 10, for example. Further, the information indicative of a position at each angle may be set in the trajectory DB 601 such that the position at each angle is calculated (estimated or derived) based on the image captured by the image capturing apparatus 50 by AI or the like using deep learning or the like, for example. The history of movement of a rectangular area is information indicative of the transition of the position of a rectangular area including each vehicle that is detected based on the image captured by the image capturing apparatus 50.

The information processing apparatus 10 may first determine the vehicle type and the vehicle speed of a specific vehicle in the image. In this case, the information processing apparatus 10 may determine the vehicle type by performing image recognition on a rectangular area including the vehicle in the image, for example. Further, the information processing apparatus 10 may determine the vehicle speed based on the change of the position of the rectangular area including the vehicle on the pixel coordinates over frames.

Then, the information processing apparatus 10 may acquire, from the trajectory DB 601, the image capturing apparatus ID of the image capturing apparatus 50 that captures the image, and the trajectory and the information indicative of a position at each angle that correspond to the determined vehicle type and the determined vehicle speed. Hereby, for example, by use of the trajectory and so on corresponding to the vehicle type and the vehicle speed, the position of the front face of the vehicle can be calculated more appropriately.

The information processing apparatus 10 calculates an intersection between the trajectory and a predetermined side of the rectangular area including the vehicle in the image. Then, the information processing apparatus 10 calculates the tangent of the trajectory at the intersection. Subsequently, the information processing apparatus 10 calculates an angle θ formed between the tangent and the x-axis (the downward direction along the vertical direction (the height) of the image).

Then, the information processing apparatus 10 calculates the position, in the x-axis direction, of the central part of the front face of the vehicle in the rectangular area based on the angle θ and a function f(θ). Further, the information processing apparatus 10 calculates the position, in the y-axis direction, of the central part of the front face of the vehicle in the rectangular area based on the angle θ and a function g(θ). Note that the function f(θ) and the function g(θ) are examples of the information indicative a position at each angle that is set in the trajectory DB 601.

In the example of FIG. 7, a tangent 714 of a trajectory 731 at an intersection 713 between the trajectory 731 and a lower side 712 of a rectangular area 711 including a vehicle in an image 701 captured by the image capturing apparatus 50 is calculated. Further, an angle $\theta_1$ formed between the tangent 714 and the x-axis is calculated. Further, based on the angle $\theta_1$ and the function f(θ) and the function g(θ) illustrated in in FIG. 8, a position 721 of a central part of the front face of the vehicle in the rectangular area 711 is calculated.

FIG. 8 illustrates examples of a function f(θ) 801 and a function g(θ) 802. In the example of FIG. 8, the function f(θ) 801 is a value of the ratio of the position, in the y-axis direction, of the central part of the front face of the vehicle to the length (width), in the y-axis direction, of the rectangular area including the vehicle. In the example of FIG. 8, in a range of the angle θ from 0° to 90°, the value of the function f(θ) 801 increases linearly from 0.5 to 1.0. Accordingly, when the vehicle enters from the end portion 531 side in the image, the angle θ is generally 0°. Therefore, the position, in the y-axis direction, of the central part of the front face of the vehicle in the rectangular area including the vehicle is calculated to be about half (0.5) of the length of the rectangular area in the y-axis direction. Further, when the vehicle goes out from the end portion 533 in the image, the angle θ is generally 90°. Therefore, the position, in the y-axis direction, of the central part of the front face of the vehicle in the rectangular area including the vehicle is calculated to be placed generally at a right end (1.0) of the rectangular area in the y-axis direction.

In the example of FIG. 8, the function g(θ) 802 is a value of the ratio of the position, in the x-axis direction, of the central part of the front face of the vehicle to the length (height), in the x-axis direction, of the rectangular area including the vehicle. In the example of FIG. 8, in a range of the angle θ from 0° to about 10°, the value of the function g(θ) 802 is about 1.0, and in a range of the angle θ from 10° to 90°, the value of the function g(θ) 802 decreases linearly from 1.0 to about 0.7.

Accordingly, when the vehicle enters from the end portion 531 side in the image, the angle θ is generally 0°. Therefore, the position, in the x-axis direction, of the central part of the front face of the vehicle in the rectangular area including the vehicle is calculated to be placed at a lower end (1.0) of the rectangular area in the x-axis direction. Further, when the vehicle goes out from the end portion 533 in the image, the angle θ is generally 90°. Therefore, the position, in the x-axis direction, of the central part of the front face of the vehicle in the rectangular area including the vehicle is calculated to be placed on a lower side (0.7) of the rectangular area in the x-axis direction from the half of the rectangular area in the x-axis direction.

Similarly, in the example of FIG. 9, a tangent 914 of the trajectory 731 at an intersection 913 of the trajectory 731 with a lower side 912A and a right side 912B of a rectangular area 911 including a vehicle in an image 901 captured by the image capturing apparatus 50 is calculated. Further, an angle $θ_2$ formed between the tangent 914 and the x-axis is calculated. Further, based on the angle $θ_2$ and the function f(θ) and the function g(θ) illustrated in in FIG. 8, a position 921 of a central part of the front face of the vehicle in the rectangular area 911 is calculated.

Similarly, in the example of FIG. 10, a tangent 1014 of the trajectory 731 at an intersection 1013 of the trajectory 731 with a right side 1012 of a rectangular area 1011 including a vehicle in an image 1001 captured by the image capturing apparatus 50 is calculated. Further, an angle $θ_3$ formed between the tangent 1014 and the x-axis is calculated. Further, based on the angle $θ_3$ and the function f(θ) and the function g(θ) illustrated in in FIG. 8, a position 1021 of a central part of the front face of the vehicle in the rectangular area 1011 is calculated.

Hereby, in terms of the image 501 in FIG. 5, the position of the central part of the front face of each vehicle is calculated as illustrated in FIG. 11. In the example of FIG. 11, a position 1101 of the central part of the front face of the vehicle 511, a position 1102 of the central part of the front face of the vehicle 512, and a position 1103 of the central part of the front face of the vehicle 513 are calculated. Note that the following describes a case where the position of a vehicle is tracked over a plurality of frames in a case where the vehicle moves in a direction toward the image capturing apparatus 50 and then turns left as illustrated in FIG. 5. In this case, when the position of the vehicle is tracked based on the position of a lower left corner of the rectangular area including the vehicle, the moving distance within a predetermined time is relatively short. On that account, the traveling speed of the vehicle is calculated to be relatively low. Further, when the position of the vehicle is tracked based on the position of a lower right corner of the rectangular area including the vehicle, the fluctuation of the position of the vehicle in the y-axis direction is relatively large. Meanwhile, with this disclosure, the track of the vehicle can be calculated appropriately.

Subsequently, the output portion 13 of the information processing apparatus 10 outputs information such as a warning corresponding to the calculated position of the front face of the vehicle (step S4). Here, for example, as illustrated in FIG. 12, the information processing apparatus 10 may generate an image 1201 of a schematic view where the road 510 is viewed from above by performing ortho-rectification on the positions 1101, 1102, 1103 of the central parts of the front surface of the vehicles 511, 512, 513 in the image 501 of FIG. 11. The information processing apparatus 10 may transmit the generated image 1201 to the vehicle terminal 30 such that the image 1201 is displayed.

Further, in a case where the information processing apparatus 10 determines that there is a possibility that one of the vehicles may collide with another one of the vehicles based on the transitions of the positions of the vehicles, for example, the information processing apparatus 10 may transmit a warning to promote a brakes operation to the vehicle terminals 30 of the vehicles.

Update of Trajectory

The controlling portion 12 of the information processing apparatus 10 may update trajectories stored in the trajectory DB 601 based on tracks of respective positions of a plurality of vehicles that are calculated based on images captured ty the image capturing apparatus 50. Hereby, based on actual driving of the vehicles, for example, the positions of the front faces of the vehicles can be detected more appropriately. In this case, based on histories of movement of rectangular areas including vehicles corresponding to each vehicle speed and each type stored in the trajectory DB 601, the information processing apparatus 10 may calculate the transitions (tracks) of movement of the positions of the central parts of the front faces of the vehicles, for example. The information processing apparatus 10 may store the average of the tracks thus calculated as a trajectory for the vehicle speed and the vehicle type.

Effect Of This Disclosure

In recent years, the technology about self-driving has developed. In order to realize self-driving at level 4 or the like, the cooperation with an apparatus (e.g., a sensor provided on a roadside) other than a host vehicle has been considered. It is considered that safer and smoother traffic can be supported by providing information based on the sensor to a vehicle side. In the meantime, in a case of a system that recognizes the position of a vehicle by unifying various sensors (e.g., a stereo camera, a light detection and ranging (LiDAR) sensor, a millimeter wave radar), it is necessary that software and hardware be complicated and highly functionalized.

In the meantime, with this disclosure, the position of the vehicle can be detected with the monocular image capturing apparatus 50 (camera) as the sensor. Further, by using information on a trajectory set in advance in accordance with the angle of view of the image capturing apparatus 50 and the shape of a road, the position of the vehicle can be detected appropriately while a throughput is reduced.

Modifications

The information processing apparatus 10 may be an apparatus included in one housing, but the information processing apparatus 10 of this disclosure is not limited to this. Each part of the information processing apparatus 10 may be implemented by cloud computing constituted by one or more computers, for example. Further, at least part of the process of the information processing apparatus 10 may be executed by at least one of the server 20, the vehicle terminal 30, and the image capturing apparatus 50. Further, the information processing apparatus 10 may be an apparatus integrally with at least one of the server 20, the vehicle terminal 30, and the image capturing apparatus 50. Even such an information processing apparatus is also included in the examples of the "information processing system" of this disclosure.

Note that the disclosure is not limited to the above embodiment, and various modifications can be made within a range that does not deviate from the gist of the disclosure.

What is claimed is:

1. An information processing system comprising:
a processor; and
a memory, wherein
the processor is configured to:
acquire an image captured by an image capturing apparatus provided on a roadside, the image including a captured vehicle;
calculate a bounding box for the captured vehicle in the image, the bounding box being represented by pixel values in an XY coordinate system, the XY coordinate system having an X-axis in a vertical direction of the image and a Y-axis in a horizontal direction of the image, and the bounding box being a rectangle that has a vertical edge parallel to the X-axis and a horizontal edge parallel to the Y-axis;
acquire information stored in the memory, the information including a recorded trajectory and a recorded center position of a vehicle front face, the recorded center position of the vehicle front face being represented by a ratio to a vertical edge length of a bounding box and a ratio to a horizontal edge length of the bounding box, and the recorded center position of the vehicle front face being recorded in correspondence with an angle between the X-axis and a tangent at an intersection of the recorded trajectory and the bounding box;
calculate an angle between the X-axis and a tangent at an intersection of the recorded trajectory and the calculated bounding box; and
calculate a center position of a front face of the captured vehicle in pixel values, based on the calculated bounding box and the recorded center position of the vehicle front face corresponding to the calculated angle.

2. The information processing system according to claim 1, wherein the image capturing apparatus is provided on the roadside of a road on which the vehicle travels.

3. The information processing system according to claim 1, wherein the processor is configured to output a warning based on the calculated center position of the front face of the captured vehicle.

4. The information processing system according to claim 1, wherein
the memory stores the recorded trajectory per vehicle type, and
the processor is configured to:
determine a vehicle type of the captured vehicle based on the image; and
calculate the center position of the front face of the captured vehicle based on the recorded trajectory that corresponds to the determined vehicle type.

5. The information processing system according to claim 1, wherein
the memory stores the recorded trajectory per vehicle speed, and
the processor is configured to:
determine a vehicle speed of the captured vehicle based on the image; and
calculate the center position of the front face of the captured vehicle based on the recorded trajectory that corresponds to the determined vehicle speed.

6. The information processing system according to claim 1, wherein the processor updates the recorded trajectory based on tracks of positions of a plurality of captured vehicles, the tracks being calculated for each vehicle of the plurality of captured vehicles based on the images captured by the image capturing apparatus.

7. The information processing system according to claim 1, wherein the processor is configured to update the recorded trajectory based on a track of the calculated center position of the front face of the captured vehicle.

8. The information processing system according to claim 1, wherein the processor is configured to:
generate a schematic image of a road by plotting a marker that indicates the calculated center position of the front face of the captured vehicle; and
transmit the generated schematic image to a display provided on the captured vehicle.

9. An information processing method comprising:
acquiring an image captured by an image capturing apparatus provided on a roadside, the image including a captured vehicle;
calculating a bounding box for the captured vehicle in the image, the bounding box being represented by pixel values in an XY coordinate system, the XY coordinate system having an X-axis in a vertical direction of the image and a Y-axis in a horizontal direction of the image, and the bounding box being a rectangle that has a vertical edge parallel to the X-axis and a horizontal edge parallel to the Y-axis;
acquiring information including a recorded trajectory and a recorded center position of a vehicle front face, the recorded center position of the vehicle front face being represented by a ratio to a vertical edge length a bounding box and a ratio to a horizontal edge length of the bounding box, and the recorded center position of the vehicle front face being recorded in correspondence with an angle between the X-axis and a tangent at an intersection of the recorded trajectory and the bounding box;
calculating an angle between the X-axis and a tangent at an intersection of the recorded trajectory and the calculated bounding box; and
calculating a center position of a front face of the captured vehicle in pixel values, based on the calculated bounding box and the recorded center position of the vehicle front face that corresponds to the calculated angle.

10. A non-transitory storage medium that stores a program causing a computer to execute a process of:
acquiring an image captured by an image capturing apparatus provided on a roadside, the image including a captured vehicle;
calculating a bounding box for the captured vehicle in the image, the bounding box being represented by pixel values in an XY coordinate system, the XY coordinate system having an X-axis in a vertical direction of the image and a Y-axis in a horizontal direction of the image, and the bounding box being a rectangle that has a vertical edge parallel to the X-axis and a horizontal edge parallel to the Y-axis;
acquiring information including a recorded trajectory and a recorded center position of a vehicle front face, the recorded center position of the vehicle front face being represented by a ratio to a vertical edge length of a bounding box and a ratio to a horizontal edge length of the bounding box, and the recorded center position of the vehicle front face being recorded in correspondence with an angle between the X-axis and a tangent at an intersection of the recorded trajectory and the bounding box;

calculating an angle between the X-axis and a tangent at an intersection of the recorded trajectory and the calculated bounding box; and calculating a center position of a front face of the captured vehicle in pixel values, based on the calculated bounding box and the recorded center position of the vehicle front face that corresponds to the calculated angle.

* * * * *